(12) United States Patent
Worrell et al.

(10) Patent No.: US 7,159,897 B2
(45) Date of Patent: Jan. 9, 2007

(54) ISOLATED GROUND FOR HORN MECHANISM

(75) Inventors: Barry C. Worrell, Centerville, OH (US); Gopal P. Marath, Vandalia, OH (US); James J. Simpson, Fairborn, OH (US); Scott R. Albers, Sidney, OH (US)

(73) Assignee: Delphi Technologies, Inc., Troy, MI (US)

( * ) Notice: Subject to any disclaimer, the term of this patent is extended or adjusted under 35 U.S.C. 154(b) by 372 days.

(21) Appl. No.: 10/797,440

(22) Filed: Mar. 10, 2004

(65) Prior Publication Data

US 2005/0017484 A1    Jan. 27, 2005

Related U.S. Application Data

(60) Provisional application No. 60/488,926, filed on Jul. 21, 2003.

(51) Int. Cl.
*B60R 21/203*     (2006.01)
*H01H 9/00*       (2006.01)
(52) U.S. Cl. .................................... 280/731; 200/61.55
(58) Field of Classification Search .............. 280/731; 200/61.55
See application file for complete search history.

(56) References Cited

U.S. PATENT DOCUMENTS

| | | | | |
|---|---|---|---|---|
| 5,239,147 A | * | 8/1993 | Allard et al. ............. | 200/61.54 |
| 5,303,952 A | * | 4/1994 | Shermetaro et al. ........ | 280/731 |
| 5,410,114 A | * | 4/1995 | Furuie et al. ............. | 200/61.55 |
| 5,459,294 A | * | 10/1995 | Danielson ................ | 200/61.54 |
| 5,593,178 A | * | 1/1997 | Shiga et al. .............. | 280/731 |
| 5,627,352 A | * | 5/1997 | Suzuki et al. ............ | 200/61.54 |
| 5,650,600 A | * | 7/1997 | Walters ................... | 200/61.54 |
| 5,727,811 A | * | 3/1998 | Nagata et al. ............ | 280/731 |
| 5,738,369 A | * | 4/1998 | Durrani ................... | 280/731 |
| 5,931,492 A | * | 8/1999 | Mueller et al. .......... | 280/728.2 |
| 6,079,737 A | * | 6/2000 | Isomura et al. ........... | 280/731 |
| 6,675,675 B1 | * | 1/2004 | Sauer et al. ................ | 74/552 |
| 6,682,092 B1 | * | 1/2004 | Schutz et al. ............. | 280/731 |
| 6,688,638 B1 | * | 2/2004 | Schutz .................... | 280/728.2 |
| 6,783,150 B1 | * | 8/2004 | Ahlquist ................. | 280/728.2 |
| 6,830,263 B1 | * | 12/2004 | Xu et al. .................... | 280/731 |
| 6,871,870 B1 | * | 3/2005 | Schneider et al. ........ | 280/728.2 |
| 6,942,247 B1 | * | 9/2005 | Simpson .................. | 280/731 |
| 7,052,035 B1 | * | 5/2006 | Kreuzer .................. | 280/728.2 |
| 7,053,322 B1 | * | 5/2006 | Helmstetter et al. ..... | 200/61.54 |

(Continued)

FOREIGN PATENT DOCUMENTS

DE    WO 00/74980 A1    6/2000

*Primary Examiner*—Paul N. Dickson
*Assistant Examiner*—Joselynn Y. Sliteris
(74) *Attorney, Agent, or Firm*—Jimmy L. Funke

(57) ABSTRACT

An apparatus for providing an isolated ground of a horn activation circuit of a steering wheel assembly comprising an airbag module, the apparatus comprising: an insulator for receiving and engaging a wire, wherein the wire and the insulator are configured to engage at least one securement member of the steering wheel assembly, wherein the airbag module is movably secured to the insulator for movement between a first position and a second position wherein the horn circuit is completed as the airbag module moves from the first position to the second position; and a wire harness electrically communicating with the wire and at least one contact portion of the airbag module, the at least one contact portion making contact with the wire as the airbag module moves from the first position to the second position.

17 Claims, 17 Drawing Sheets

U.S. PATENT DOCUMENTS

| | | | |
|---|---|---|---|
| 2002/0074781 A1* | 6/2002 | Schutz et al. | 280/731 |
| 2005/0012311 A1* | 1/2005 | Schneider et al. | 280/731 |
| 2005/0116452 A1* | 6/2005 | Lee | 280/731 |
| 2005/0161308 A1* | 7/2005 | Frisch | 200/61.54 |
| 2006/0028001 A1* | 2/2006 | Heil et al. | 280/731 |
| 2006/0175816 A1* | 8/2006 | Spencer et al. | 280/731 |

* cited by examiner

US 7,159,897 B2

ISOLATED GROUND FOR HORN MECHANISM

CROSS REFERENCE TO RELATED APPLICATIONS

This application claims the benefit of provisional patent application filed on Jul. 21, 2003, Ser. No. 60/488,926 the contents of which are incorporated herein by reference thereto.

TECHNICAL FIELD

The present disclosure relates to horn mechanisms and more particularly the present disclosure relates to an apparatus and method for maintaining an isolated ground for a horn mechanism used with an airbag module.

BACKGROUND

Vehicles are supplied with driver's side airbag modules; generally the driver's side airbag module is located in the center of the steering wheel. This is also the same location where a horn-activating switch has traditionally been mounted.

Various mounting mechanisms have been used for securing the inflatable restraint module to a support structure in a vehicle, such as a steering wheel or dashboard. In one known mounting mechanism, mounting bolts are provided passing from a rear of the support structure and threadably engaging nuts mounted on the inflatable restraint module. In another known mounting mechanism for a vehicle steering wheel, sleeve members mounted to the inflatable restraint module and surrounding the mounting bolts may be forced into contact with a plate forming the supporting structure on a hub portion of the steering wheel to complete a circuit for actuating or activating a horn.

Eventually, the horn-activating switch was adapted for mounting on the underside of the airbag module wherein the module was mounted in a "free floating" arrangement to allow the user to activate the horn by applying an activation pressure to the module and move the driver's side airbag module into a horn activation position. Such horn-activating switches react to a user-applied force to the cover in an effort to sound the horn. For example, and in such a system the entire airbag module moves as force is applied to actuate the horn.

Once attached the module is capable of movement through the application of a user-applied force wherein a horn circuit is completed in accordance with known technologies.

In most vehicles, the electrical path of the horn mechanism runs from the positive lead coming from the column coil, through the horn mechanism, through the steering wheel armature, and "grounding" through the column. In order to prevent this device or any other device mounted on the steering wheel assembly from using an alternative grounding circuit it is desirable to have an isolated ground associated with the horn mechanism.

SUMMARY

This disclosure relates to a floating horn system in which the driver's side airbag module is provided with an isolated ground.

An apparatus for providing an isolated ground of a horn activation circuit of a steering wheel assembly comprising an airbag module, the apparatus comprising: an insulator for receiving and engaging a wire, wherein the wire and the insulator are configured to engage at least one securement member of the steering wheel assembly, wherein the airbag module is movably secured to the insulator for movement between a first position and a second position wherein the horn circuit is completed as the airbag module moves from the first position to the second position; and a wire harness electrically communicating with the wire and at least one contact portion of the airbag module, the at least one contact portion making contact with the wire as the airbag module moves from the first position to the second position.

BRIEF DESCRIPTION OF THE DRAWINGS

FIGS. 18, 20, 21, 25 and 26A–27B are views of portions of other alternative exemplary embodiments of the present invention;

DETAILED DESCRIPTION OF EXEMPLARY EMBODIMENTS

This disclosure relates to an apparatus for providing an isolated ground to a horn mechanism. In an exemplary embodiment the isolated ground assembly comprises a portion of an airbag module assembly. Thus, the isolated ground assembly is secured to the airbag module prior to the airbag module being secured to the steering wheel or steering wheel armature. Alternatively, and in accordance with an alternative exemplary embodiment the isolated ground assembly is first mounted to the steering wheel or steering wheel armature prior to the driver's side airbag module being secured thereto. In this embodiment the isolated ground assembly is mounted between the driver's side airbag module and the steering wheel or alternatively the isolated ground assembly is mounted to the backside of the steering wheel or steering wheel armature.

An airbag module connection assembly provides a means for allowing an airbag module 10 to be connected to a steering wheel armature or equivalent structure as well as allowing movement of the airbag module from a first position to a second position in order to complete a horn activation circuit.

In accordance with an exemplary embodiment a plastic insulator is attached to and comprises a portion of the horn mechanism assembly. Routed through the insulator is the wire harness. The wire harness has two terminals at each end. The terminals are fixed in place using a connection means such as a flap or other equivalent structure at the ends of the insulator. The flap folds down over the terminal and after heat staking it in place, it secures the terminal. On the opposite free end of the harness, a connector is attached. This connector will be attached to the mating connector coming from the column coil.

Figure 18:
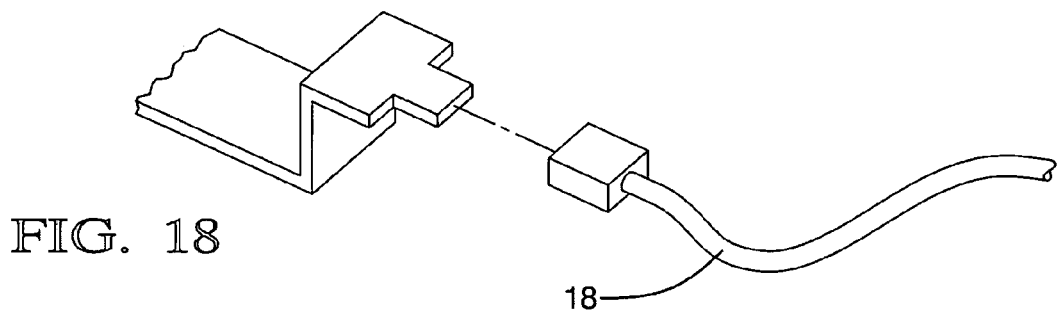

Alternatively, flag terminals are employed which plug directly into the conductive portion of the insulator (See FIG. 18). Here a blade like feature on the insulator provides the attachment point for the flag terminal. By dimensioning the insulator blade closely to the opening of the flag terminal, the flag terminal can be securely attached to the insulator without inadvertently coming off. Furthermore, the attachment method for the flag terminal provides one main advantage over a dome shaped terminal. It is easy to install the flag terminal since it can be plugged in and held in position.

In an exemplary embodiment, the insulator of the isolated ground can be molded from plastic. Thus, the insulator is made out of plastic instead of steel. This part provides both electrical isolation as well as bearing the load applied by a deploying airbag.

Then this assembly can be attached to the steering wheel via two locking pins attached to the armature (e.g., swedged, screwed or molded into the armature or any other alternative or equivalent means of securement), which are insulated therefrom.

Figure 1:
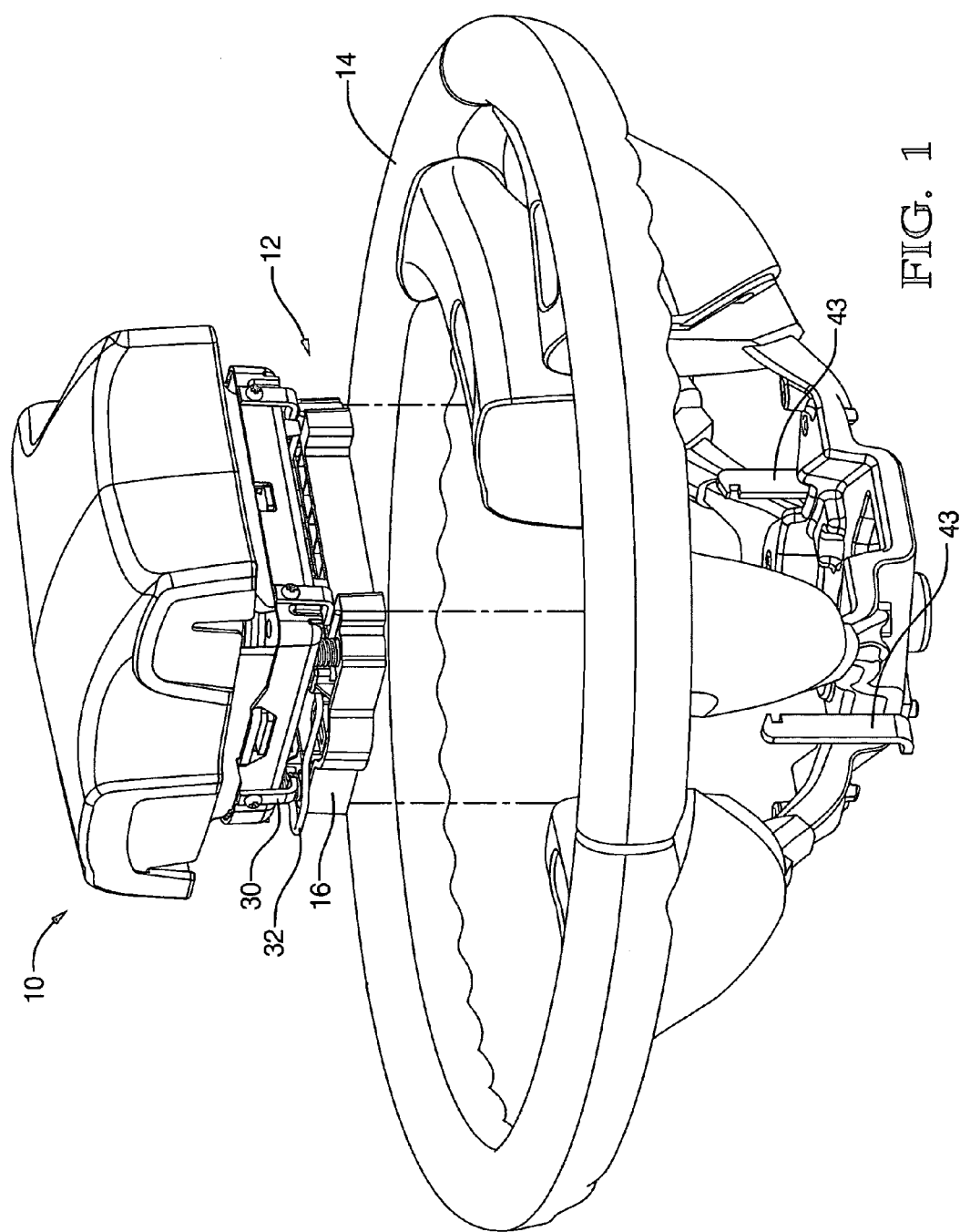
FIGS. 1–4 are partial exploded views of an exemplary embodiment of the present invention.

Referring now to FIG. 1 and in accordance with an exemplary embodiment, a driver's side airbag module 10 is illustrated with an isolated ground assembly 12. Isolated ground assembly 12 secures airbag module 10 to a steering wheel 14 wherein the isolated ground assembly provides an isolated ground for completing the circuit of a horn, which is activated upon application of a force upon the airbag module 10.

In general, and referring now to FIGS. 1–12, the isolated ground assembly comprises an insulator 16 (plastic or other easily molded non-conductive material) and a wire harness 18 with contact terminals and complimentary connectors. The insulator can be attached either to the steering wheel armature or alternatively the airbag module as the floating-horn mechanism. In one embodiment the insulator is attached to the side of the steering wheel armature mounted to the airbag module or alternatively the insulator may be attached to the backside of the armature mounted to the steering wheel column.

The wire harness attaches the column electrical coil to the driver's side airbag module horn circuit and an attachment wire serves as the ground as for the horn mechanism. The wire harness has contact terminals to which the horn mechanism makes contact to close the electrical circuit. The connector attaches to the up lead from the column coil (not shown). By making this connection to ground the ground of the horn activation circuit will be isolated from other components of the steering wheel assembly (e.g., airbag module, cruise control, directional signaling devices and any other electrical device which may be disposed on a surface of the steering wheel assembly) wherein power is routed thereto through the steering wheel column.

Figure 2:
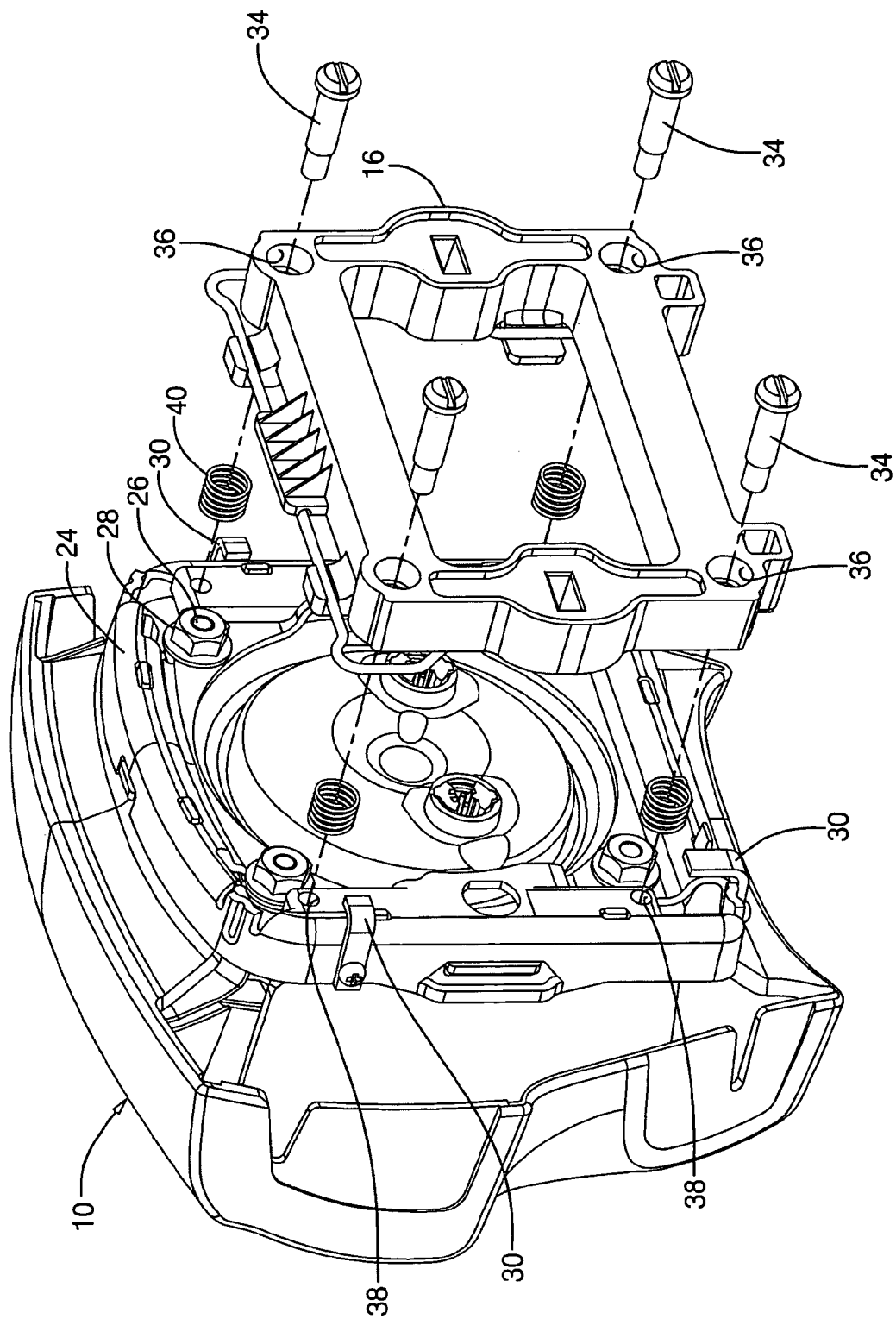
Figure 3:
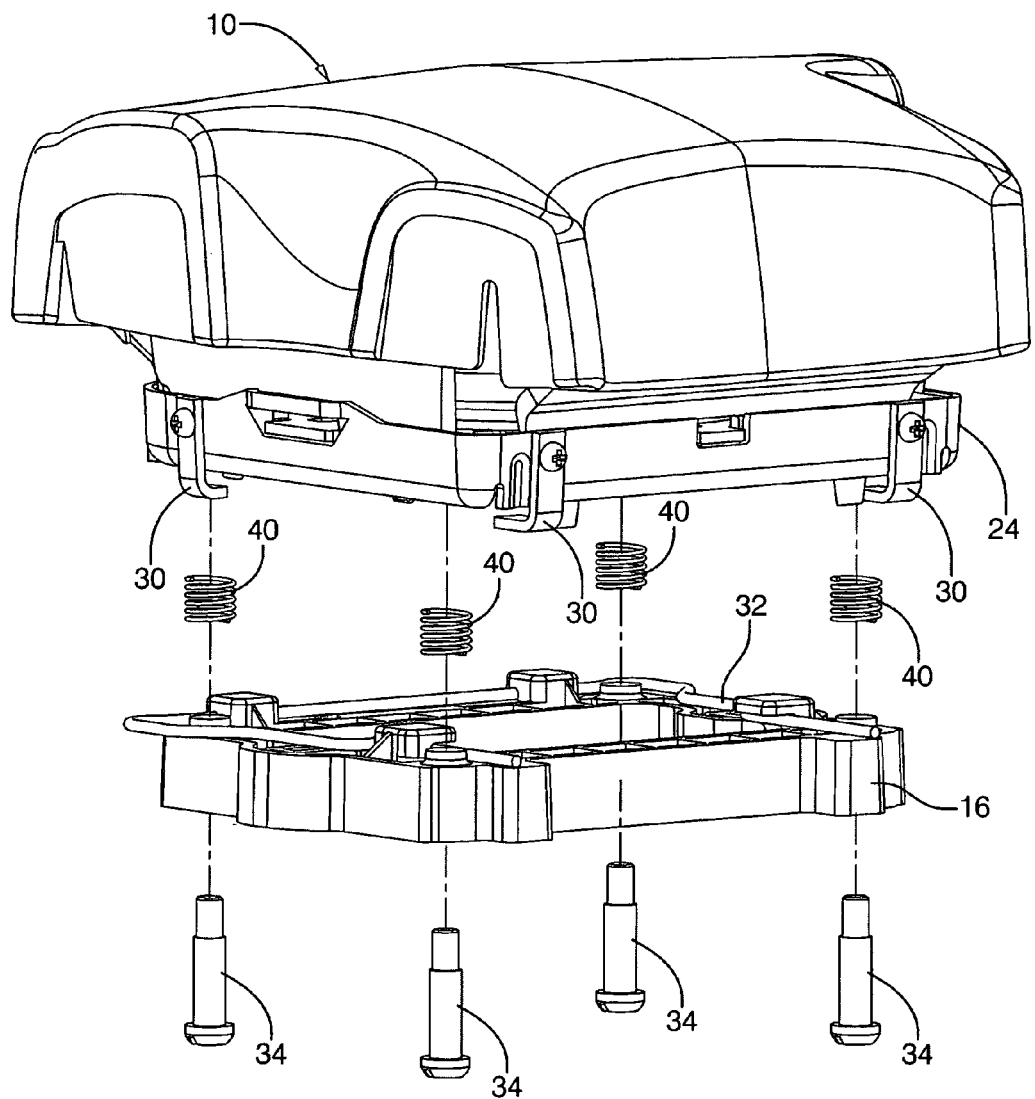
Figure 4:
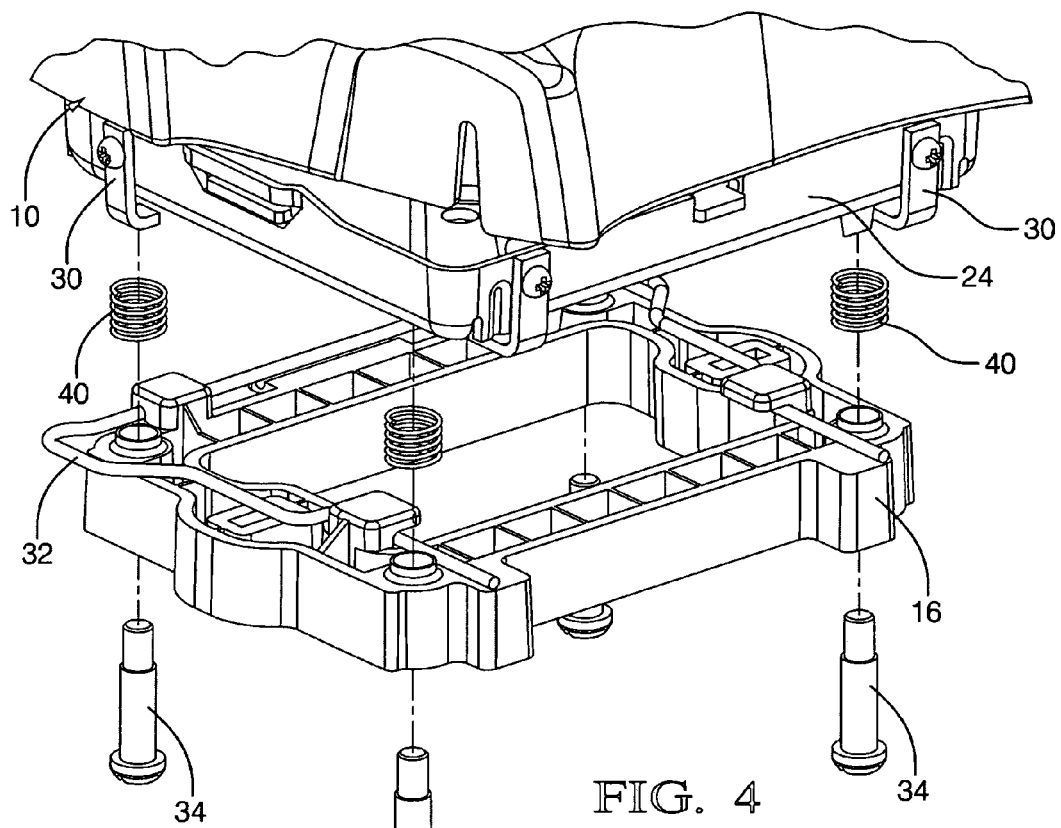

As illustrated in FIGS. 2–4, airbag module 10 comprises a backing plate 24, which is mounted to a plurality of studs 26 of a retainer ring (not shown) via nuts 28. Of course, other alternative means for mounting base plate 24 to airbag module 10 are contemplated in accordance with exemplary embodiments of the present invention. Base plate 24 further comprises a plurality of contact members 30. Contact members 30 provide a means for completing the horn activation circuit as the airbag module moves from a first non-horn activating position to a second horn activating position in response to a user applied pressure or force. Although the figures illustrate the contact members being secured to the base plate by a plurality of screws it is contemplated that in an alternative embodiment contact members 30 are integral, stamped or swedged from the material of the base plate or the backing plate 24.

In accordance with an exemplary embodiment a conductive wire or spring wire 32 is positioned on a surface of insulator 16. Accordingly, when insulator 16 is secured to base plate 24 conductive wire 32 is in a spaced relationship with respect to contact members when the airbag module is in the first or non-horn activating position. See also FIGS. 7, 10 and 11. In an exemplary embodiment conductive wire or spring wire 32 is a single piece.

Insulator 16 is secured to base plate 24 by a plurality of mounting bolts 34, which pass through openings 36 in insulator 16 and are received in threaded openings 38 in base plate 24. Prior to the securement of insulator 16 to base plate 24 a biasing spring 40 is positioned on each of the mounting bolts after they are passed through openings 36 but prior to insertion into openings 38. Biasing springs 40 provide a biasing force for maintaining the airbag module in the first or non-horn activating position illustrated in FIGS. 7, 10 and 11.

Figure 5:
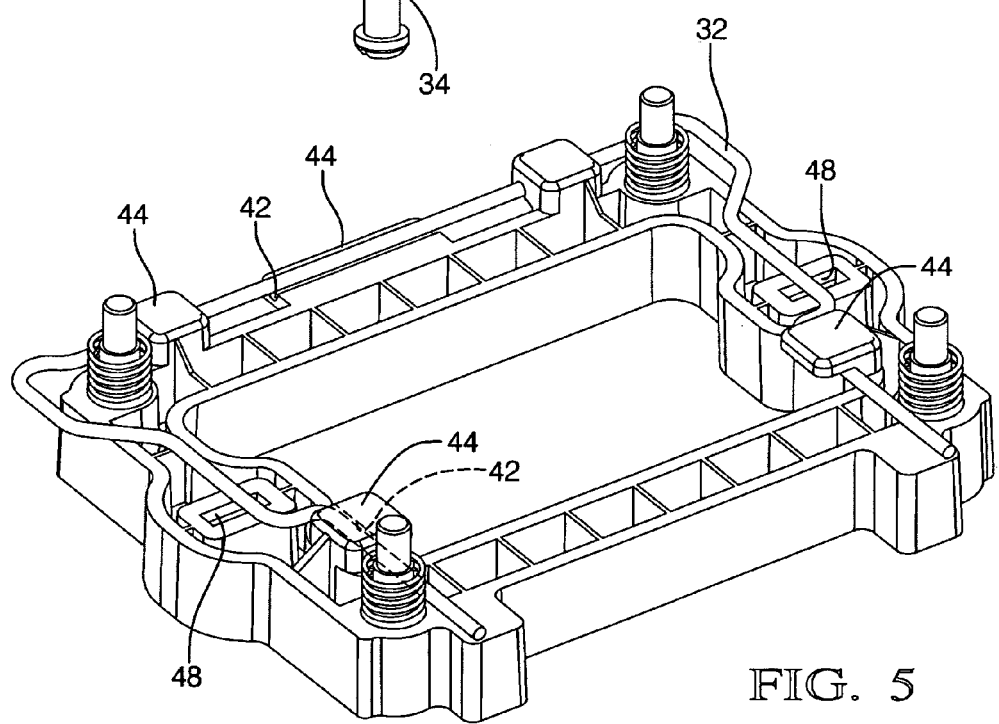
FIG. 5 is a perspective view of an insulator of the isolated ground of an exemplary embodiment of the present invention.
Figure 6:
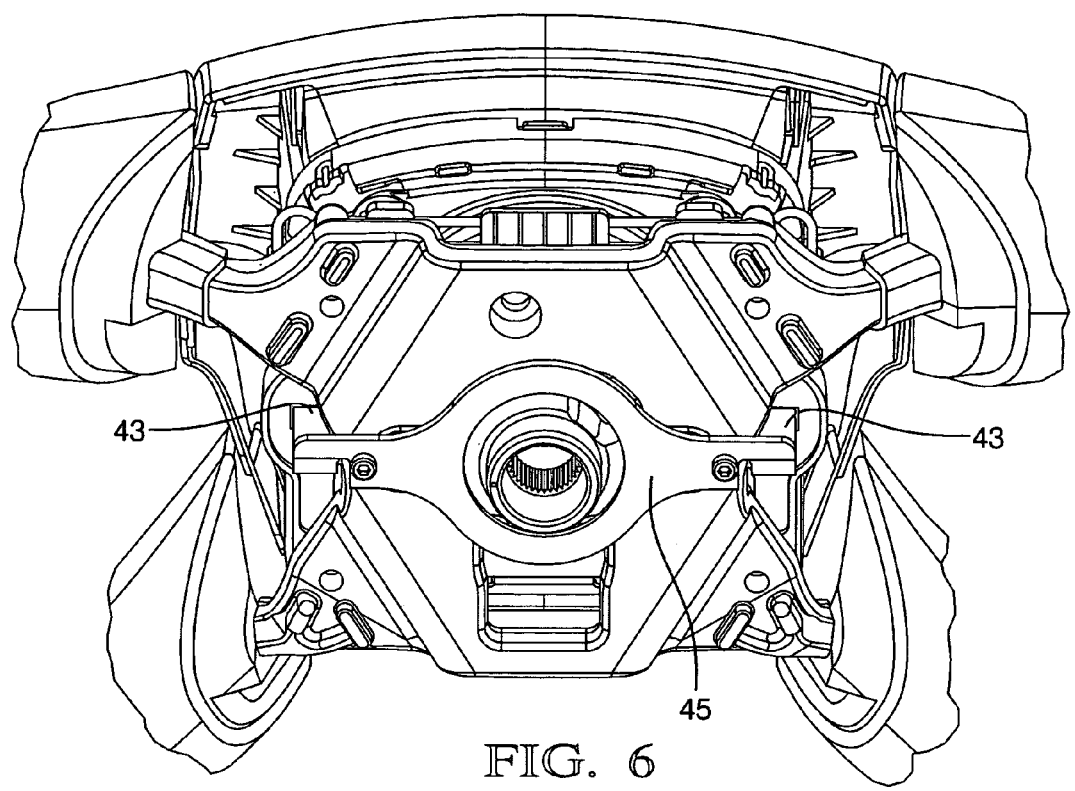
FIG. 6 is a bottom perspective view of the isolated ground of an exemplary embodiment of the present invention.
Figure 7:
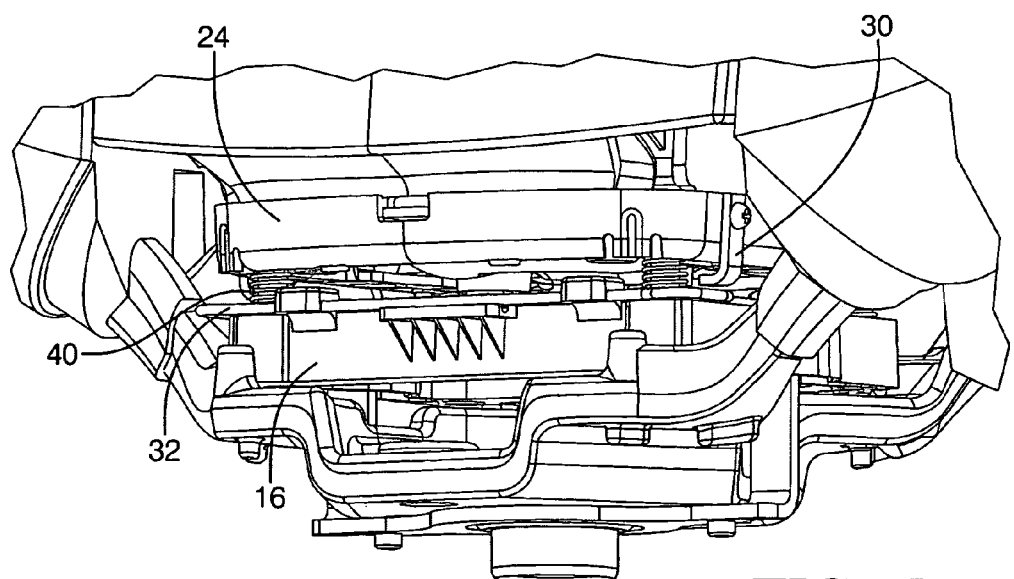
FIG. 7 is a perspective view of the isolated ground of an exemplary embodiment of the present invention.
Figure 8:
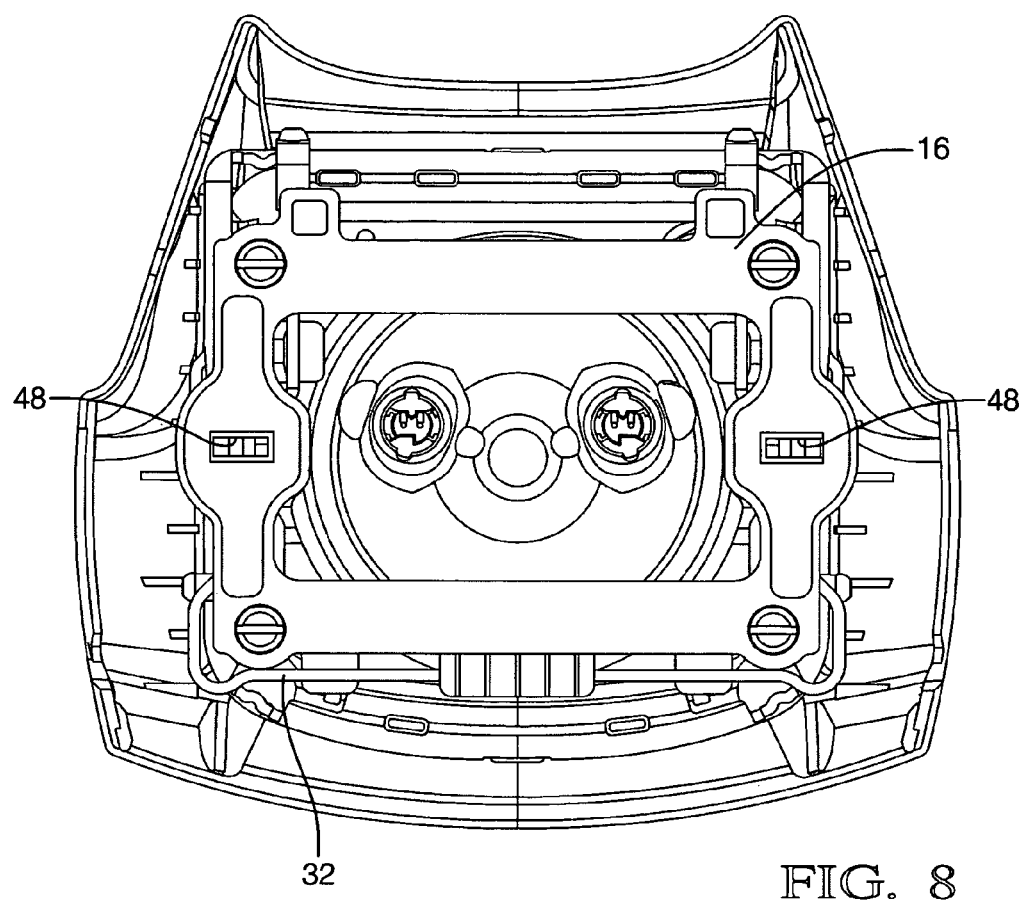
FIG. 8 is a bottom view of the isolated ground of an exemplary embodiment of the present invention.

Referring now to FIG. 5, the securement of conductive wire 32 to insulator 16 is illustrated. In accordance with an exemplary embodiment conductive wire 32 is received and snap fitted into a plurality of grooves 42 of a plurality of tabs 44. It is noted that some of the grooves and tabs are configured and positioned in alternating fashion in order to secure conductive wire 32 to a surface of insulator 16. It is also noted that conductive wire 32 has a specific configuration in order to make contact with contact members 30 as the airbag module is moved from the non-horn activating position to the horn-activating position wherein the horn activation circuit is completed.

Figure 9:
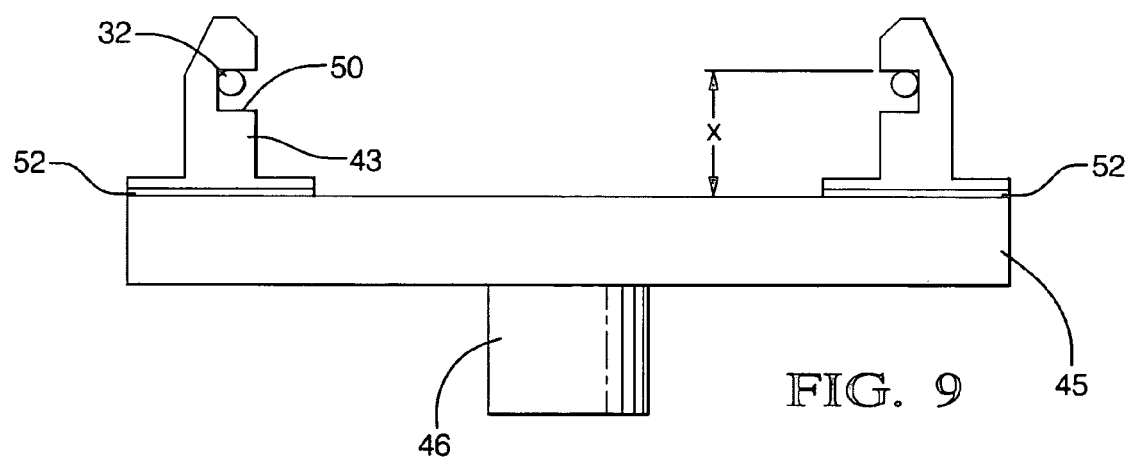
FIGS. 9 and 10 are views illustrating alternative exemplary embodiments of the present invention.
Figure 10:
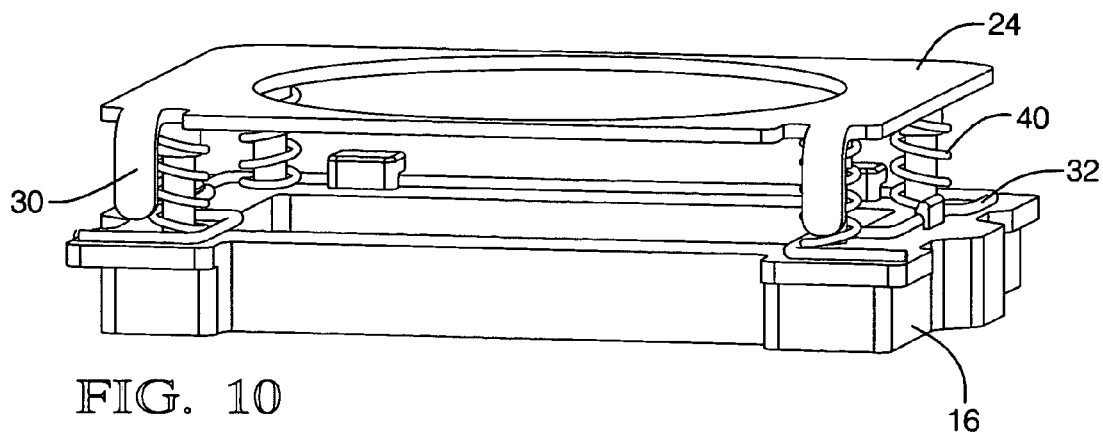

Referring now to FIGS. 5 and 9, it is also noted that conductive wire 32 provides an engagement member or portion which is engaged by a locking pin 43 of a casing 45 disposed on a hub 46 of a steering column assembly. Locking pins 43 provide a means for securing airbag module 10 to the steering wheel column by passing through a complimentary opening 48 in insulator 16, deflecting a portion of conductive wire 32 and receiving the same in a slotted opening 50 of locking pin 43 as the resilient conductive wire returns to its un-deflected position. In order to ensure that the ground of the present invention remains isolated an insulator or insulation layer 52 is disposed between locking pin 43 and casing 45. Alternatively, locking pins 43 may be made out of non-conductive materials or coated with a non-conductive material such as a phosphate. FIG. 10 illustrates a stamping 45 wherein locking pins 43 are stamped therefrom. In this embodiment, the stamping or locking pins 43 must be insulated from wire 32.

In another alternative embodiment, the locking pin is mounted directly to the casing, by mounting the locking pin to the top of the casting reduces the overall tolerance stack of the assembly and allows for smaller gaps between the airbag module and the steering wheel. This is due to the fact that the thickness of the die casting has been taken out of the equation. Normally a phenomena known as die shift causes the tolerance stack to increase by as much as 0.3 mm. The tolerance stack is illustrated by "x" in FIG. 9. The locking pins secured to casting 45 are in one embodiment are formed by a stamping process.

Figure 11:
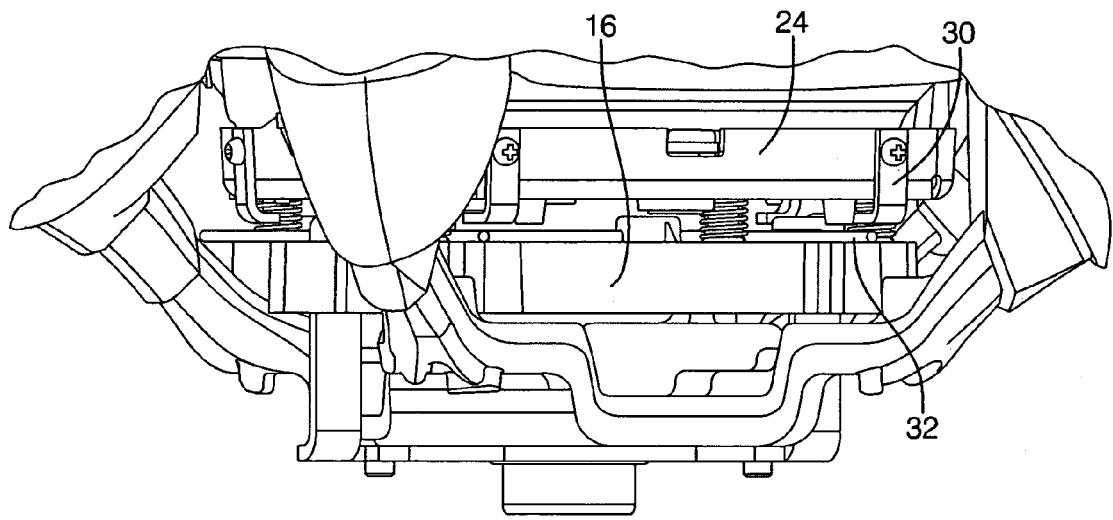
FIGS. 11 and 12 are perspective views of isolated ground of an exemplary embodiment of the present invention.
Figure 12:
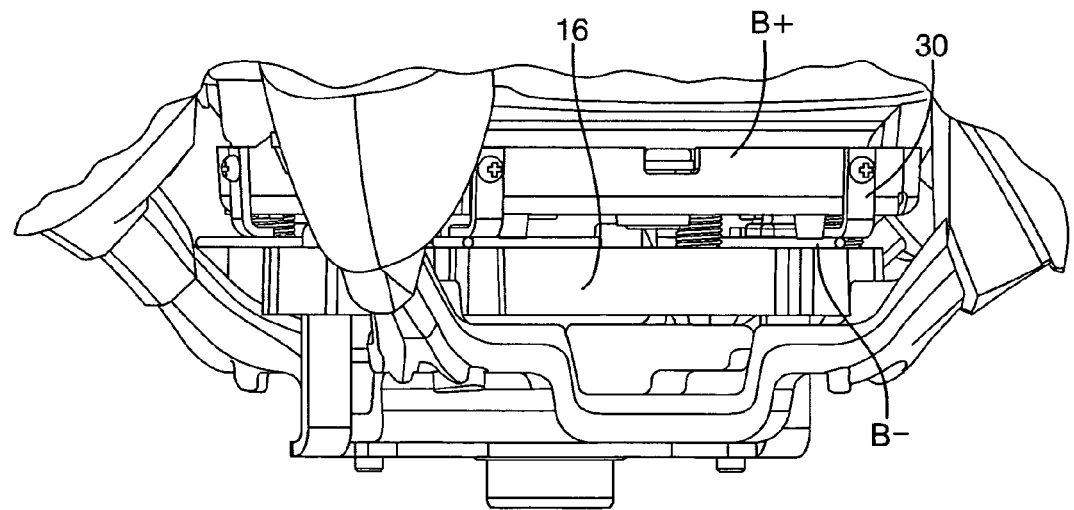
Figure 13:
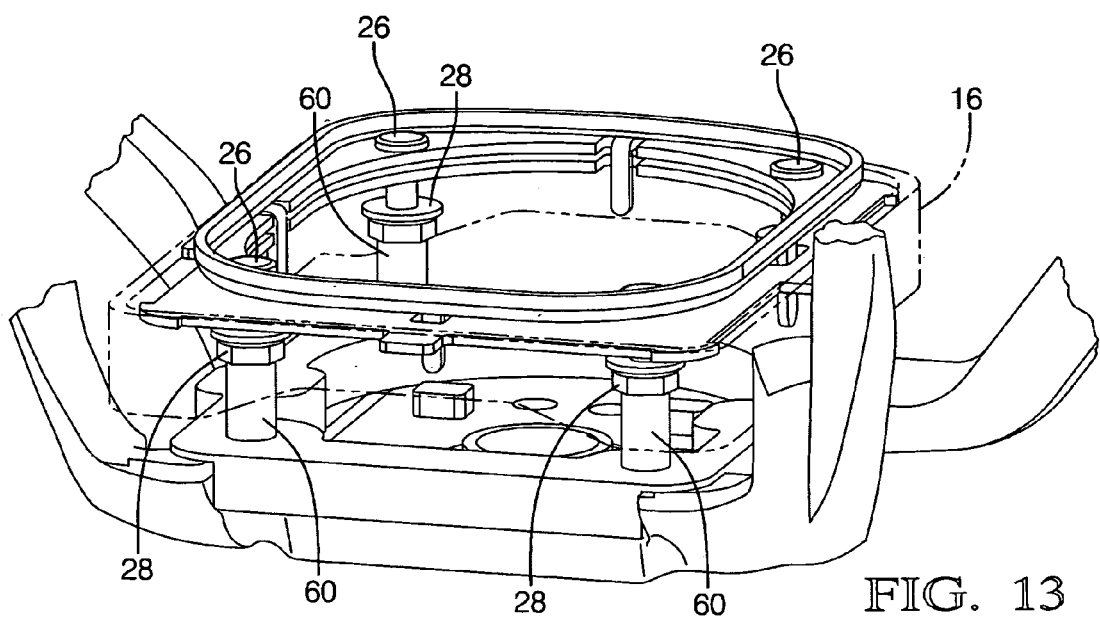
FIGS. 13–16 are views of an alternative exemplary embodiment of the present invention.
Figure 14:
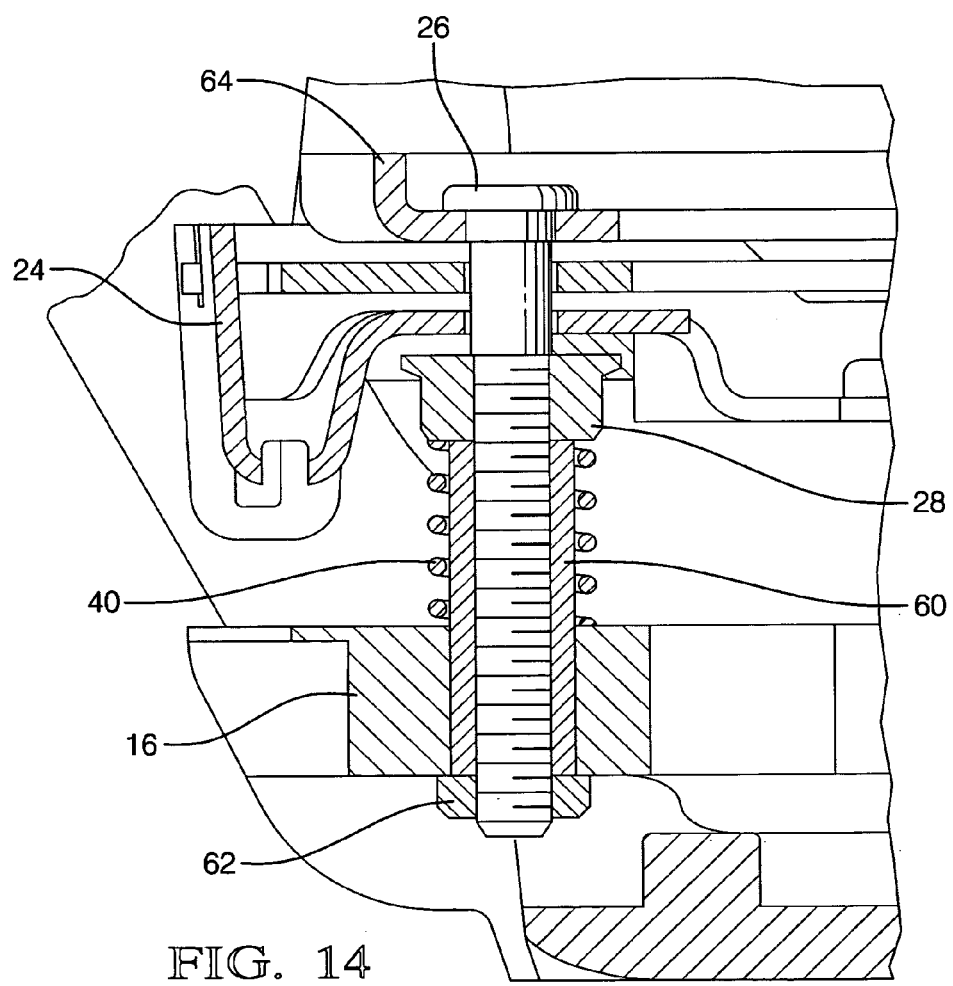
Figure 15:
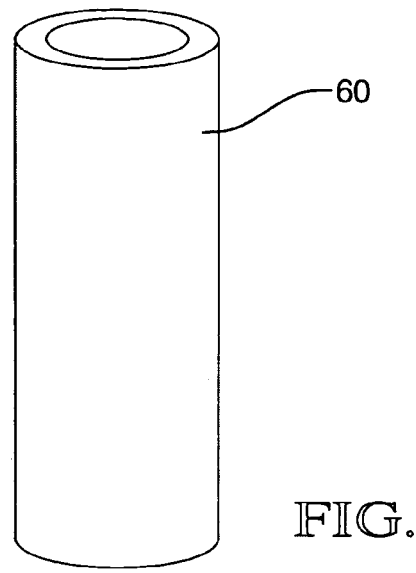
Figure 16:
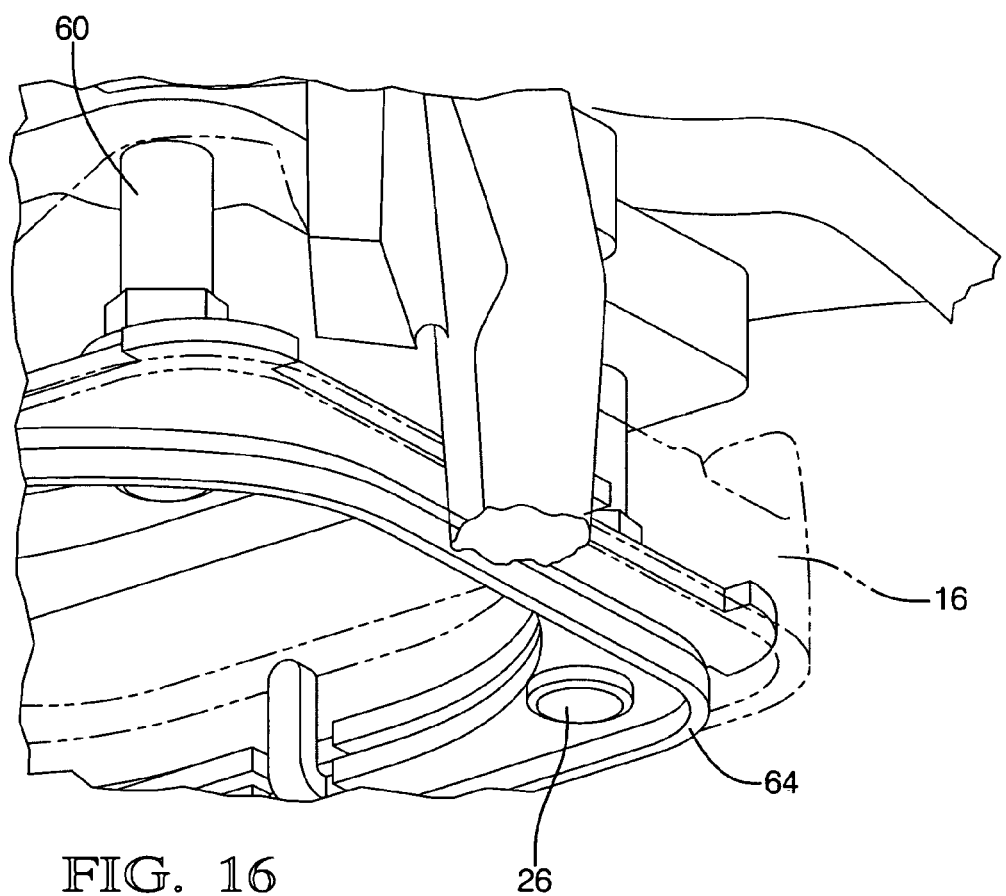

Referring now to FIGS. 11 and 12 the isolated ground of an exemplary embodiment of the present invention is illustrated. Here a B+ lead of the wire harness is illustrated as being electrically connected to the contact members of the base plate while a B− lead of the wire harness is electrically connected to the conductive wire 32. Accordingly, when the airbag module is in the non-contact position illustrated in FIG. 11 no contact is made between contact member 30 and conductive wire 32. Thus, the horn circuit is not complete. Once a user applied force overcomes the biasing force of springs 40 contact member 30 makes contact with conductive wire 32 and the horn circuit is complete (FIG. 12). Moreover, since the wire harness is routed directly to contact member or members 30 and conductive wire 32 and the same are insulated from the steering wheel armature the ground circuit is isolated wherein the desired independent or isolated ground mentioned above is provided.

As an alternative, the conductive wire or snap on spring is coated with a low contact resistant material such as tin.

Referring to the alternative exemplary embodiment of FIG. 10, here base plate 24 and contact members 30 are all one integral item such as steel thereby negating the need route the B− wire harness to each of the contact members. However, there is still a leadwire required to connect this to the clockspring circuit. This embodiment shows the baseplate with tabs that make up the integral formed contacts.

Referring now to FIGS. 13–16 an alternative exemplary embodiment of the present invention is illustrated, here the retaining ring studs are used to movably mount the insulator to the airbag module. Accordingly, in this embodiment the need for mounting bolts 34 is eliminated. As illustrated in the figures a guide member 60 is positioned about cushion retainer screw 26 and the shaft of the cushion retainer stud extends through opening 36 of the insulator. A nut 62 or other equivalent securement means is then secured to a threaded portion or alternatively a non-threaded portion of cushion retainer screw 26 and seats against guide member 60 and insulator 16 when the insulator is secured to the airbag module via nut 62 engaging screw 26. Thus, a cushion retainer 64 and insulator 16 are secured to the airbag module via the same assembly step.

As an alternative embodiment, guide member 60 is an extension of nut 28 and is positioned over screw or stud 26 when the base plate is secured to the retainer ring stud.

Also, and in order to allow for movement of the driver's side airbag module with respect to insulator 16 and in order to complete the horn activation circuit as discussed above, opening 36 is configured to allow guide member 60 to slide therethrough. In an exemplary embodiment guide member 60 and insulator 16 are both non-conductive plastic members which will not produce a larger amount of friction therebetween. Also, opening 36 will be sized to allow for such movement. As discussed above spring 40 will provide the biasing force for moving the airbag module back into a non-contacting position. Although four cushion retainer screws and complimentary guides are illustrated it is of course, contemplated that the number of cushion retainer screws and complimentary guides can vary to be greater or less than those illustrated.

Accordingly, the plastic guides slide over the cushion retainer screws to act as the guides for the horn mechanism. This eliminates the need for the shoulder bolts. The guides provide a smooth surface for the plastic insulator to travel over. In addition, the guides can also provide a set height to control the horn gap (e.g., the length of the guide sets the size of the gap (non-contacting position)).

Figure 17:
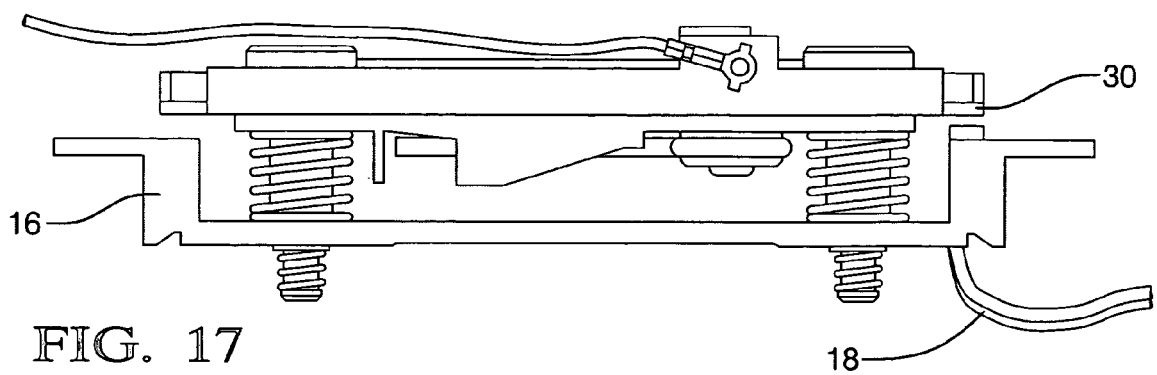
FIG. 17 is a side view of another alternative exemplary embodiment of the present invention.
Figure 19:
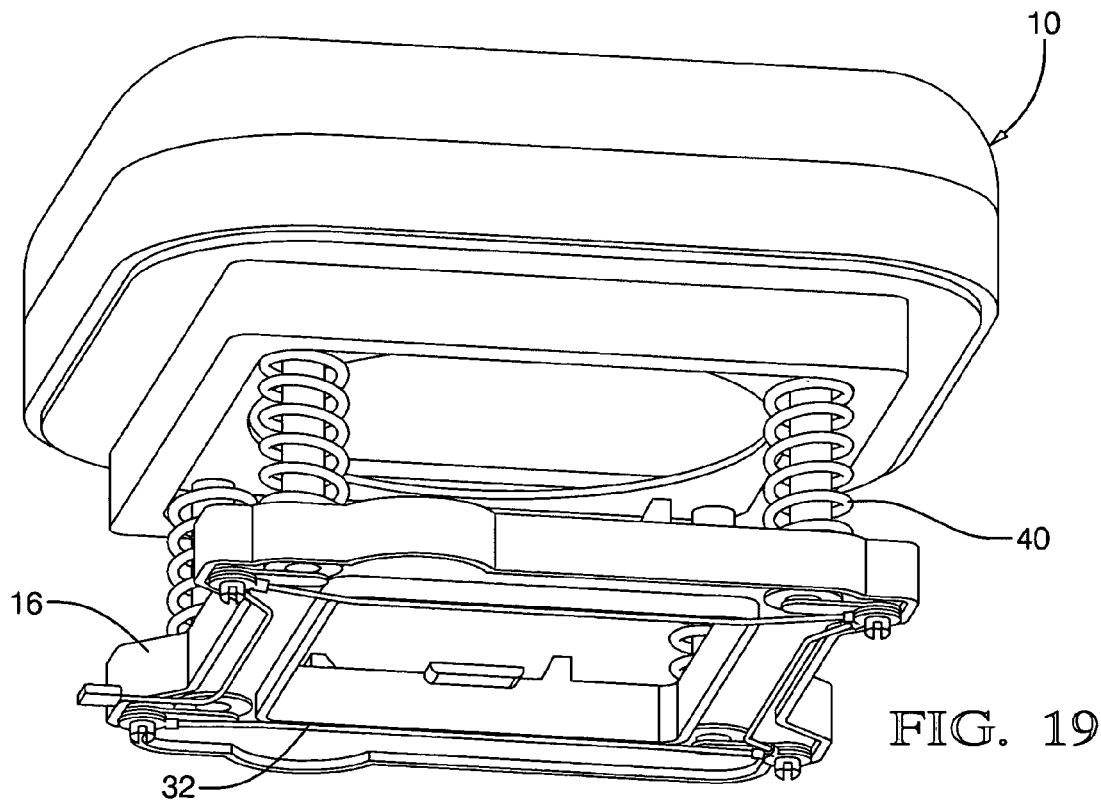
FIGS. 19, 22–24 are perspective views of still other alternative exemplary embodiments of the present invention.
Figure 23:
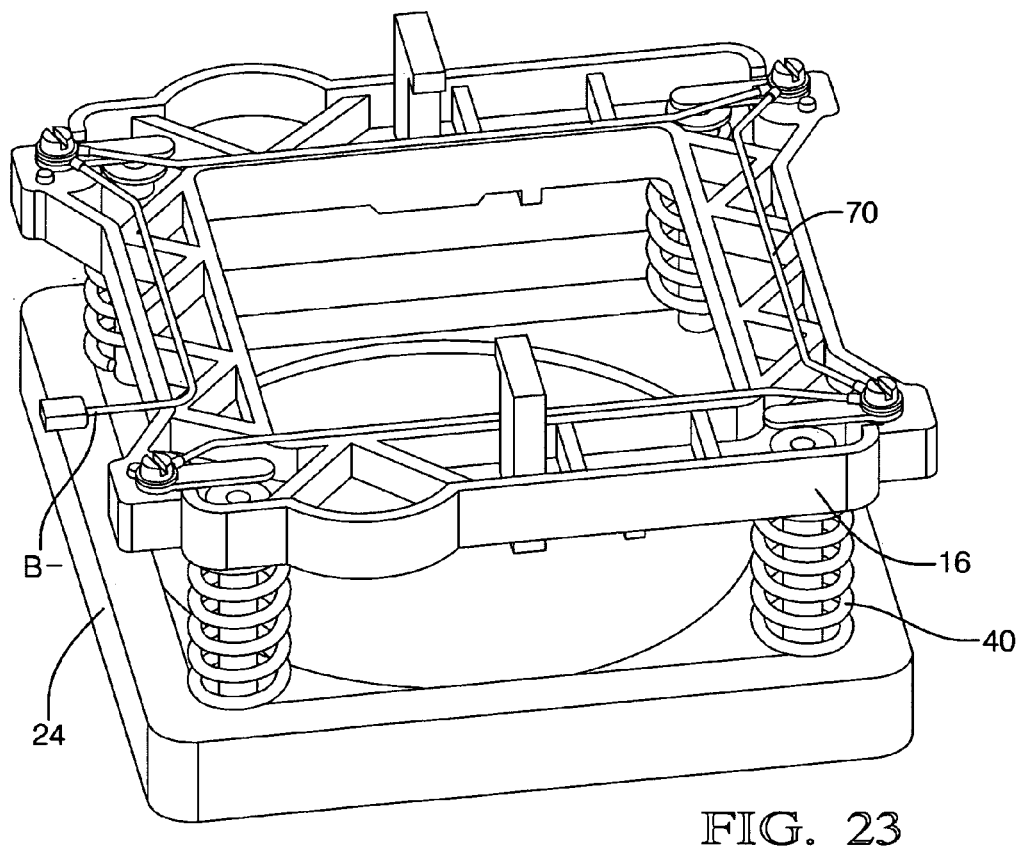
Figure 24:
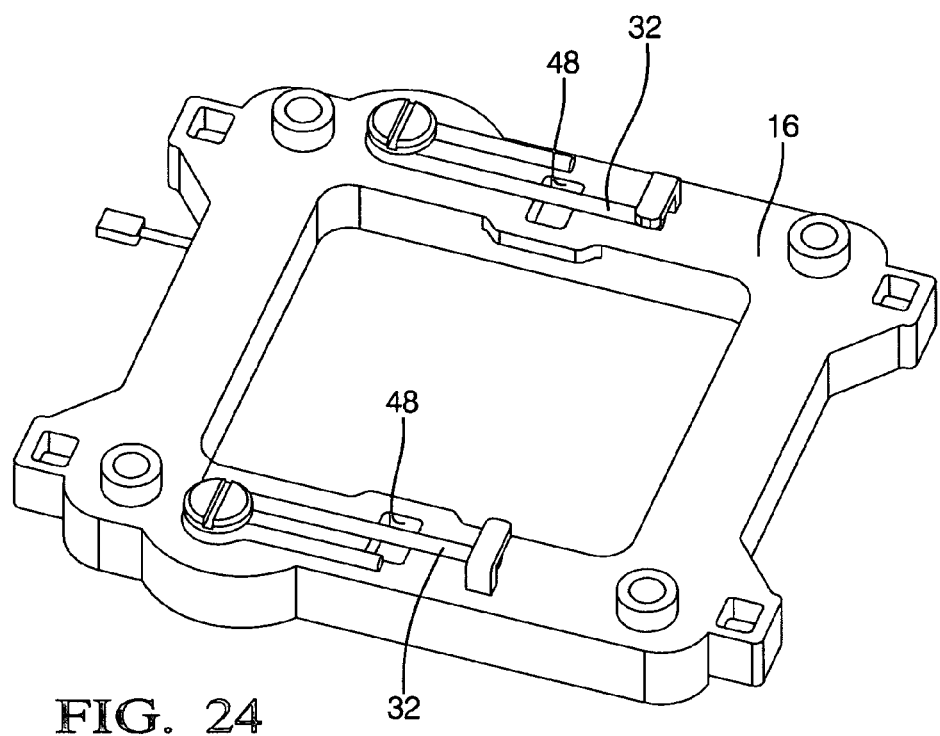
Figure 25:
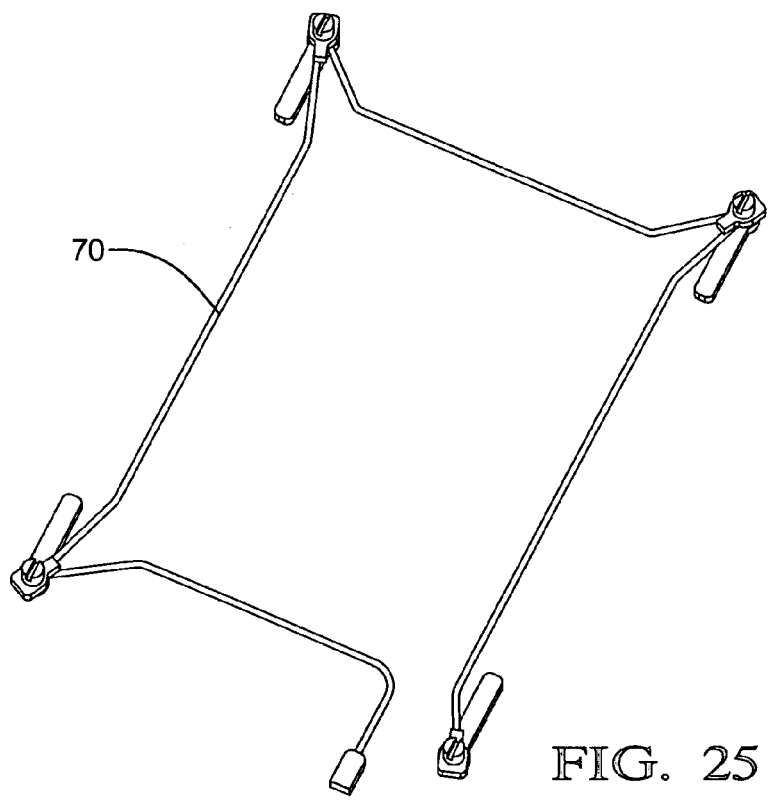
Figure 26:
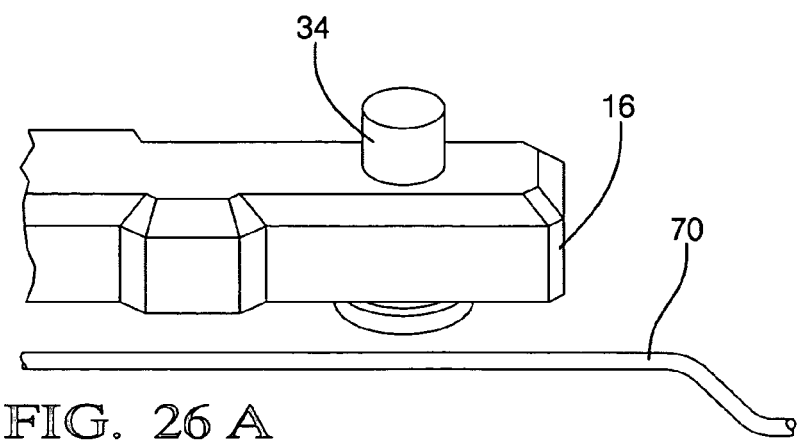
Figure 26:
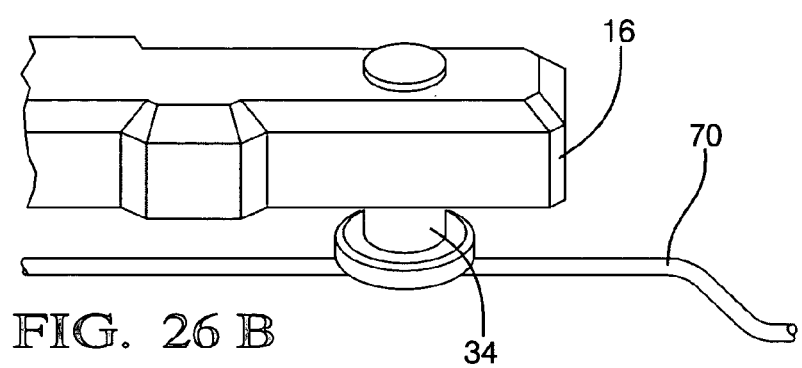
Figure 27:
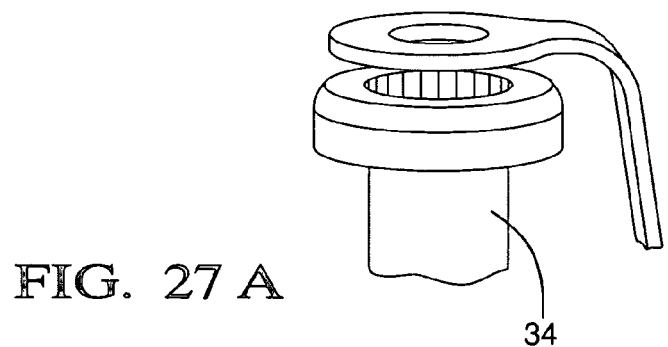
Figure 27:
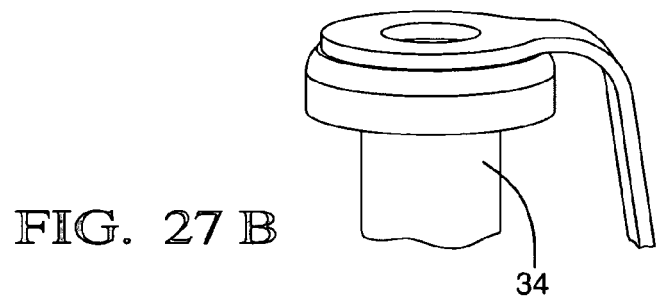
Figure 28:
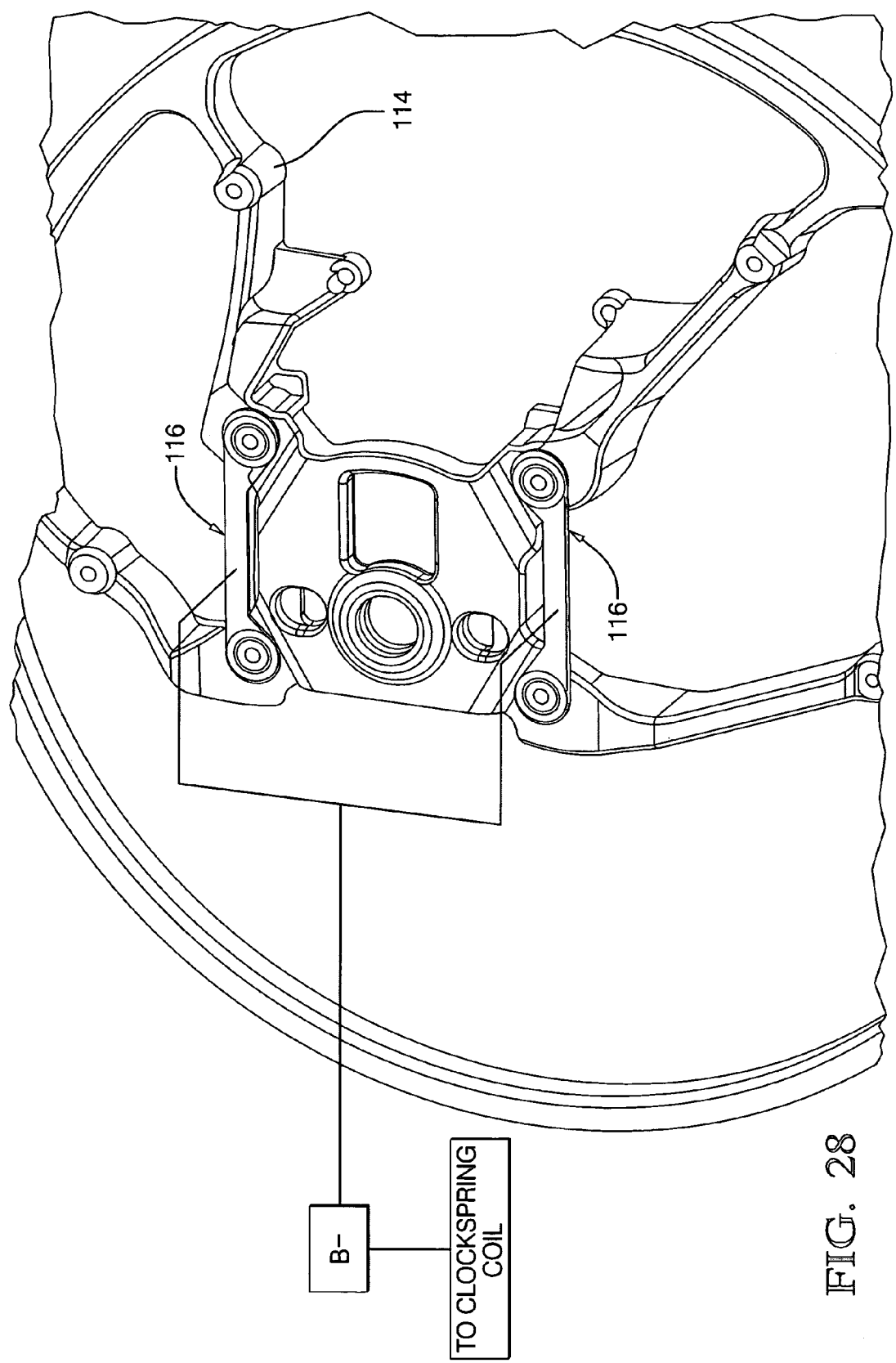
FIGS. 28–31 are perspective views of alternative exemplary embodiments of the present invention.
Figure 29:
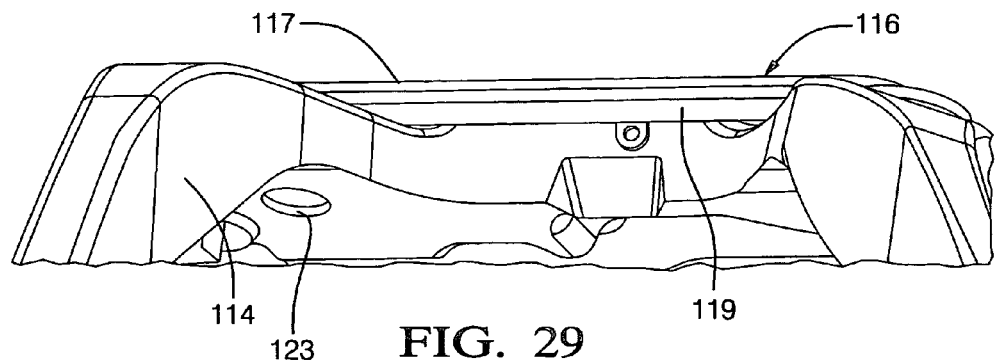

FIG. 17 illustrates an alternative arrangement of the insulator and isolated ground of the present invention. FIG. 18 illustrates one possible method for connecting the wire harness to wire 32 or other contact portion of the isolated ground of the present invention. FIGS. 19 and 23 illustrate yet another alternative exemplary embodiment of the present invention wherein conductive wire 32 is positioned on a lower side of the insulator mounted to the bottom of a driver's side airbag module.

Figure 20:
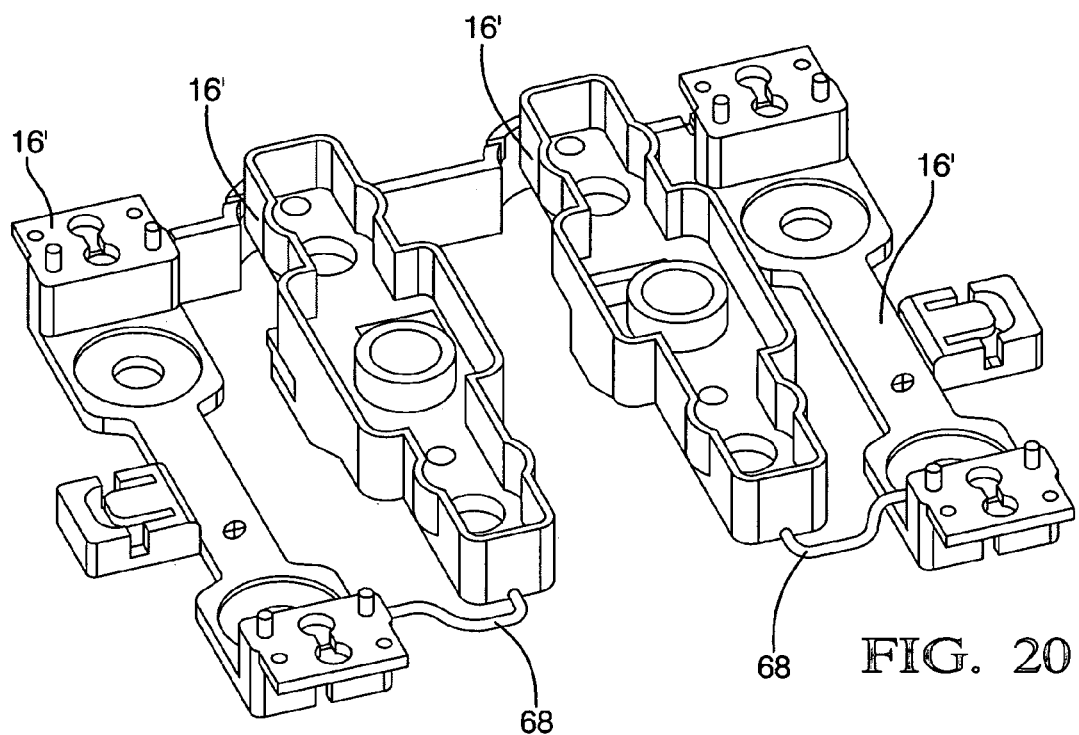
Figure 21:
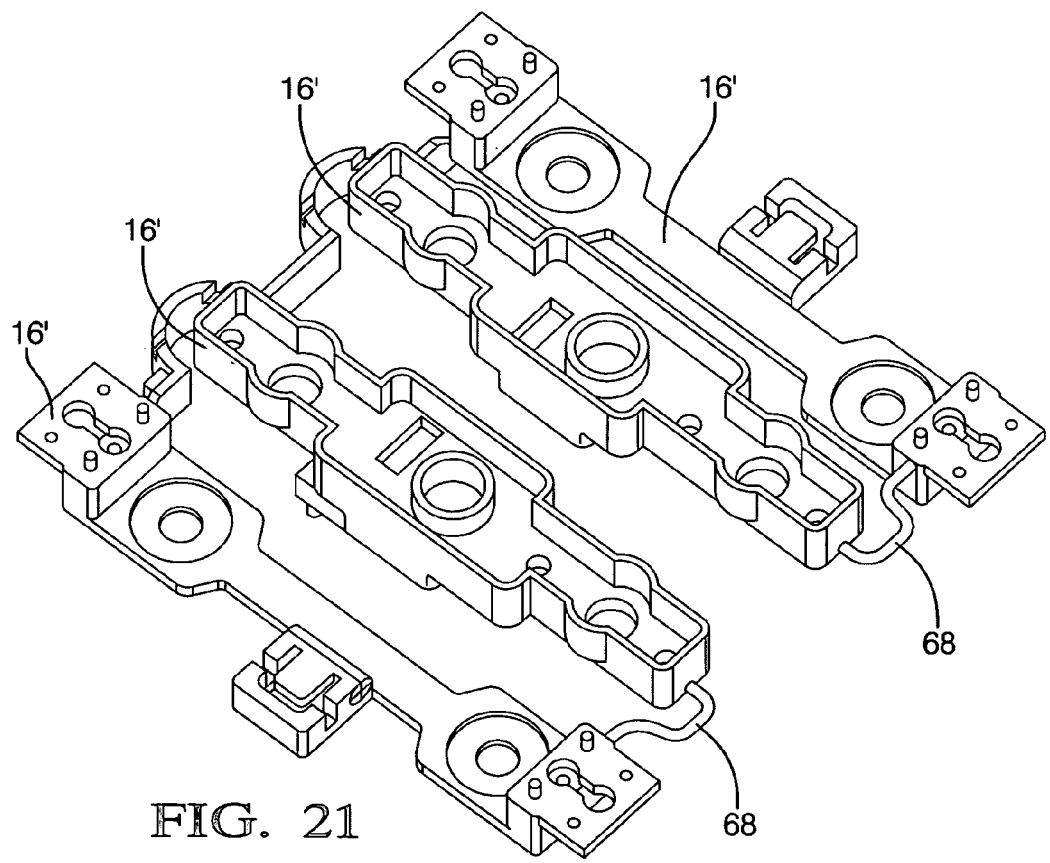
Figure 22:
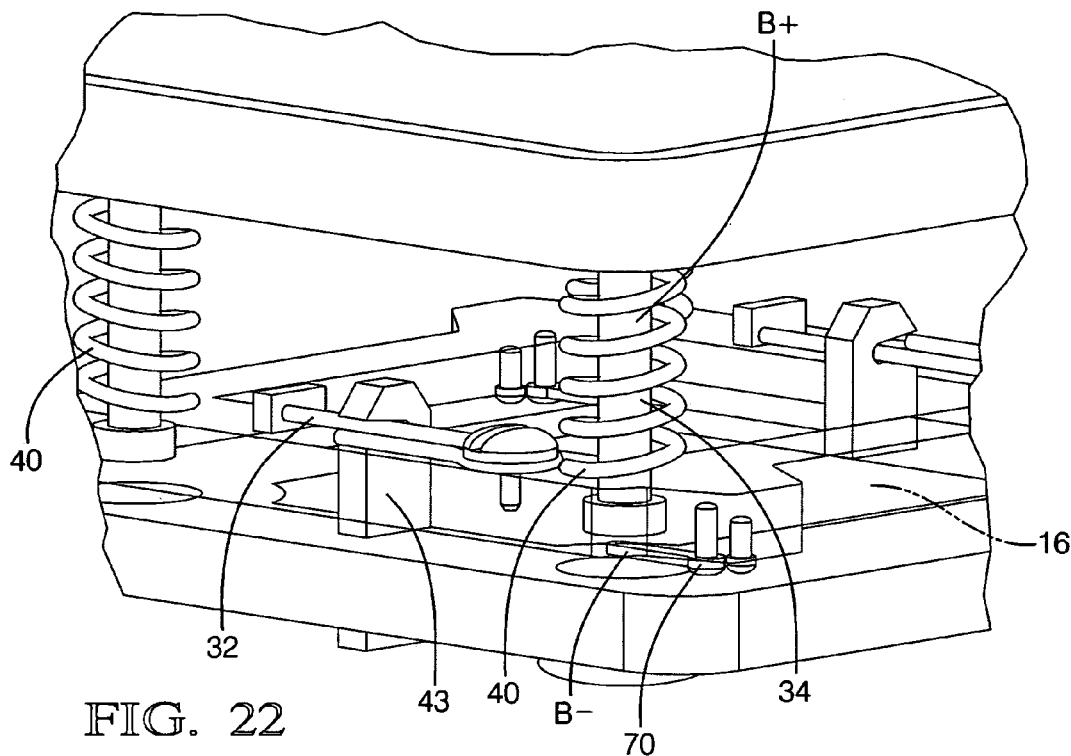

FIGS. 20 and 21 illustrate alternative configurations of insulator 16, identified as 16' which in this embodiment comprise multiple pieces for each insulator one of which is configured to be disposed on an upper surface of the steering wheel armature or lower surface of the airbag module and the other is configured to be secured to a lower or mounting surface of the steering wheel armature. In addition, FIGS. 20 and 21 illustrate that these multiple piece insulators may be manufactured using any known plastic molding techniques wherein the multiple pieces are secured to each other by a breakable connector 68, which allows the pieces to be secured as a single unit and then broken apart at the point of installation. Accordingly, such a configuration allows for manufacture of an upper and lower insulator 16' at a remote location wherein the molded parts can be shipped together to a point of installation.

Referring now to FIGS. 22–27B yet another alternative exemplary embodiment of the present invention is illustrated. Here a B− connection is provided on the insulator via a conductive element 70 and a B+ connection is provided to mounting bolt 34 which secures insulator 16 to the airbag module. In this embodiment a portion of the mounting bolt makes contact with conductive element 70 when a user applied force is provided to the airbag module in order to overcome the biasing force of spring 40.

FIGS. 26A and 26B illustrate bolt 34 making contact with a portion of element 70 while FIGS. 27A and 27B illustrate a means for connecting a conductive element to bolt 34.

Figure 30:
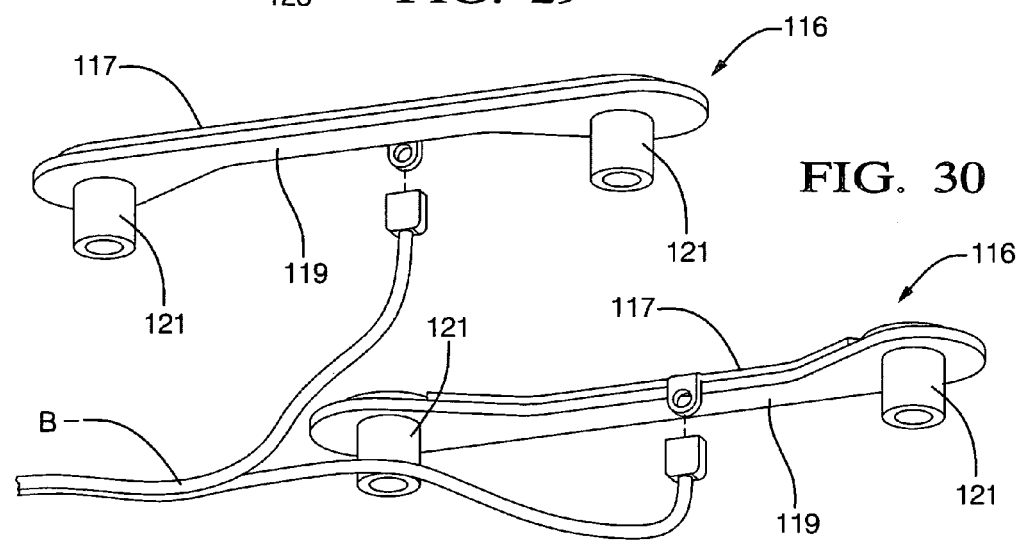

Referring now to FIGS. 28–33 an alternative exemplary embodiment of the present invention is illustrated wherein component parts performing similar or analogous functions are numbered in multiples of 100. Here insulator 116 comprises a pair of insulators mounted to the back side of, or lower mounting side of steering wheel or armature 114. Of course, the configuration and/or number of insulators 116 may vary from those illustrated in FIGS. 28–30. In this embodiment each insulator 116 comprises a conductive layer 117 and an insulating layer 119 that insulates conductive layer 117 from steering wheel 114. Also illustrated in FIG. 30 is that each insulating layer comprises an integral cylindrical portion 121 that protrudes away from a surface of insulating layer 119 and is configured to be received within an opening 123 of the steering wheel armature.

Layer 117 has provisions in the holes for the shoulder bolt 234 to screw or snap into. Thereby layer 117 serves to make the shoulder bolts 234 part of the active horn circuit. When the module 10 is depressed the heads of the shoulder bolts 234 contact the module backing plate 24 or the module baseplate and close the horn circuit. Layer 117 has a leadwire that attaches the left and right side of the assembly to one side of the polarity of the clockspring coil horn circuit.

Figure 31:
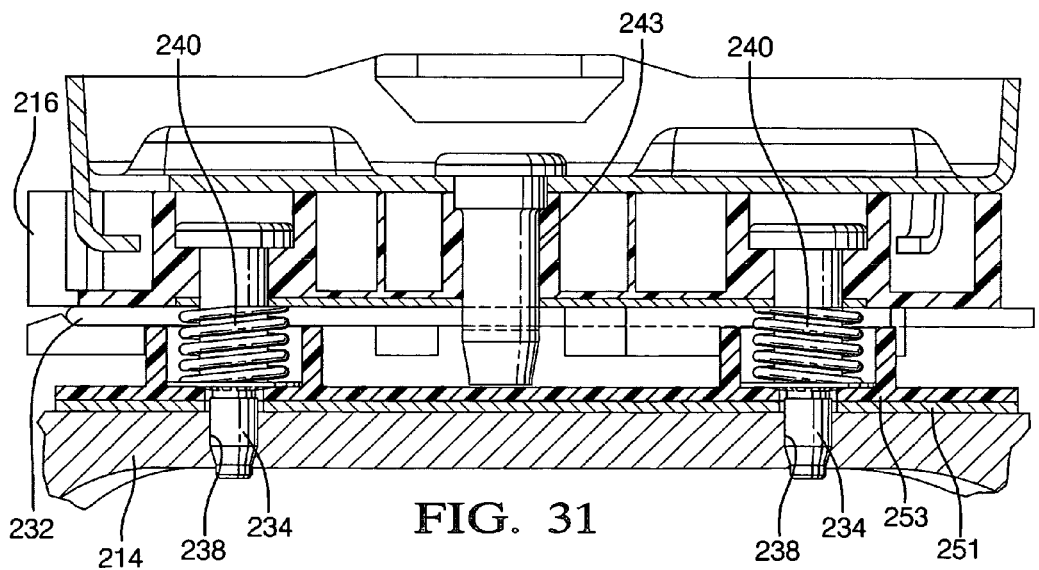
Figure 32:
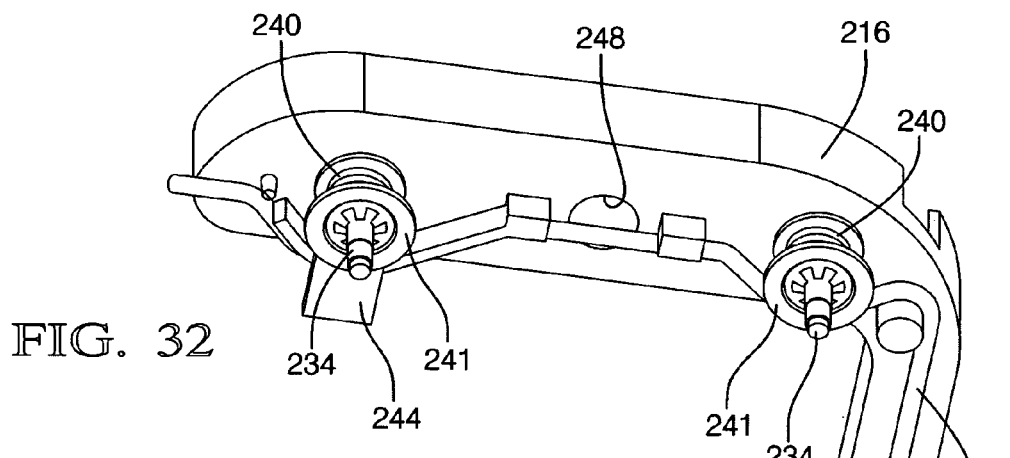
FIGS. 32 and 33 are perspective views of alternative exemplary embodiments of the present invention.
Figure 33:
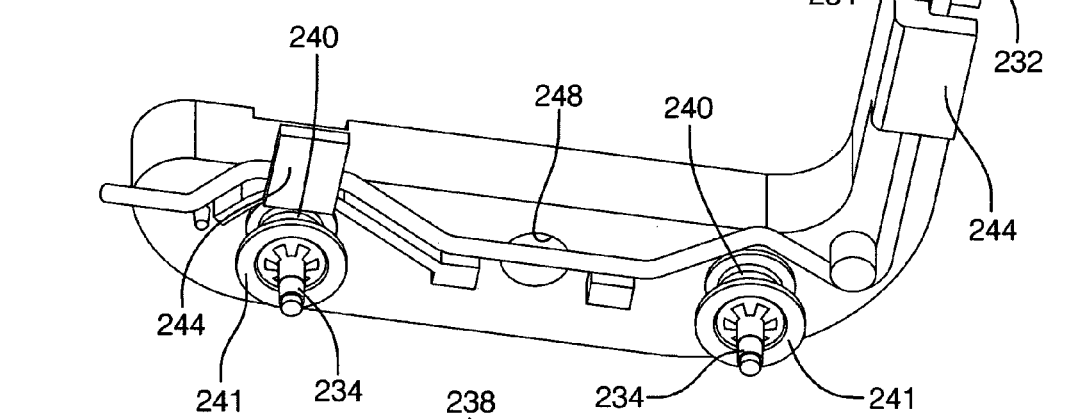
Figure 33:
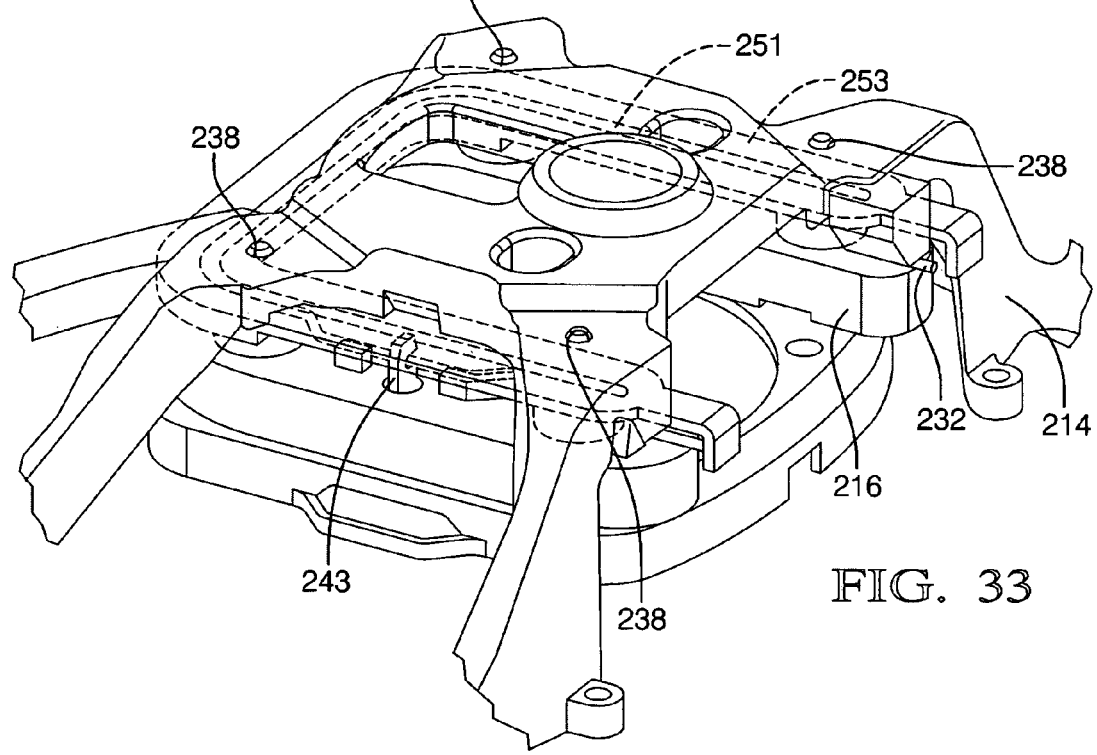

Referring now to FIGS. 31–33 yet another exemplary embodiment of the present invention is illustrated. In this embodiment the front side of the steering wheel armature is isolated. Here an insulator 216 is provided with a conductive wire 232 which is received within a plurality of tabs 244. In addition, a plurality of biasing springs 240 are received and engaged upon guide members or bolts 234 that are received within complimentary guide openings 238 in the steering wheel. In an exemplary embodiment openings 238 are threaded to receive a threaded portion of bolts 234. As illustrated in FIG. 31 springs 240 are retained by a plurality of locking pell nuts 241. Accordingly, insulator 216 is secured to the steering wheel armature in a facing spaced relationship, which is maintained by the biasing forces of springs 240.

Referring now to FIG. 33 the airbag module is secured to insulator 216 through the engagement of wire 232 by locking pin 243. In addition, to insulator 216 another insulator 251 (illustrated by the dashed lines in FIG. 32) is secured to the armature in a facing spaced relationship with regard to insulator 216. Insulator 251 also comprises a conductive element 253 that is positioned on the surface of insulator 251 facing insulator 216. As discussed above conductive element 253 is provided with a B− connection isolated from the steering wheel armature and conductive element 232 is provided with a B+ connection isolated from the armature.

In this embodiment the horn activation circuit is completed when a force is applied to the airbag module cover (not shown) sufficient enough to overcome the biasing force of springs 240 wherein wire 232 makes contact with another conductive element 253 which is insulated from the steering wheel armature by insulator 251. Accordingly, the isolated ground is provided and the circuit is closed when conductive wire 232 makes contact with conductive element 253.

The isolated ground of the embodiment of FIGS. 31–33 is assembled by first securing insulator 251 to an upper surface of the steering wheel armature wherein conductive element is provided with an insulated B-contact. Then insulator 216 is assembled as illustrated in FIG. 31. After that step bolts 234 are secured to the armature such that insulator 216 and wire 232 are in a facing spaced relationship with regard to insulator 251 and element 253. Wire 232 is provided with the B+ connection and springs 240 maintain wire 232 and element 253 in a spaced relationship. However, springs 240 also allow elements 253 and wire 232 to make contact, thus completing the horn circuit when the biasing force of springs 240 is overcome. Finally, the airbag module is secured to wire 232 and the steering wheel by passing locking pins 243 through openings 248 until the wire 232 is engaged by the locking pins.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An apparatus for providing an isolated ground of a horn activation circuit of a steering wheel assembly comprising an airbag module, the apparatus comprising:
   a non-conductive insulator for receiving and engaging a conductive wire, wherein said wire and said insulator are configured to engage at least one electrically isolated securement member of the steering wheel assembly, wherein the airbag module is movably secured to said insulator for movement between a first position and a second position wherein the horn circuit is completed as said airbag module moves from said first position to said second position; and
   a wire harness electrically communicating with said wire and another wire harness electrically communicating with at least one contact portion of the airbag module, said at least one contact portion making contact with said wire as said airbag module moves from said first position to said second position.

2. The apparatus as in claim 1, wherein said insulator is secured to the airbag module via a plurality of mounting bolts.

3. The apparatus as in claim 1, wherein said insulator is secured to the airbag module by a plurality of non-conductive guide members and a plurality of nuts which movably secure said insulator to the airbag module.

4. The apparatus as in claim 3, wherein said non-conductive guide members are configured to be positioned over securement studs of a retainer ring of the airbag module and said non-conductive guide members are configured to be slidably received within openings of said insulator.

5. The apparatus as in claim 4, wherein a biasing spring is located about each of said guide members and said biasing spring maintains said insulator in a facing spaced relationship with regard to said at least one contact portion.

6. The apparatus as in claim 1, wherein said non-conductive insulator comprises a plurality of tabs and grooves for receiving and engaging said conductive wire.

7. An isolated ground for a floating horn circuit of a driver's-side airbag module, comprising:
   a non-conductive insulator;
   a conductive member secured to said non-conductive insulator;
   a plurality of securement members for securing said insulator to the airbag module;
   a plurality of biasing members disposed over said plurality of securement members wherein said biasing members maintain said conductive member in a spaced relationship with respect to a conductive portion of the airbag module.

8. The isolated ground as in claim 7, further comprising:
   a first electrical conductor secured to said conductive member and a second electrical conductor secured to said conductive portion.

9. The isolated ground as in claim 7, wherein said non-conductive insulator is configured to have at least one opening for allowing a second securement member to pass therethrough and engage a portion of said conductive member.

10. The isolated ground as in claim 9, wherein said second securement member is electrically insulated such that grounding of said conductive member by said second securement member is prevented.

11. The isolated ground as in claim 7, wherein said conductive portion of the airbag module is integrally formed with a base plate of the airbag module.

12. The isolated ground as in claim 7, wherein said conductive member is a wire received and engaged by a plurality of tabs and grooves formed in said non-conductive insulator.

13. A steering wheel and airbag module assembly, comprising:
- a steering wheel armature having a lower mounting side and an upper mounting side;
- an airbag module configured to be mounted to said upper mounting side;
- a floating horn switch disposed between said steering wheel armature and said airbag module wherein application of a force to said airbag module causes said floating horn switch to close, said floating horn switch comprising an isolated ground, said isolated ground being electrically isolated from said steering wheel armature wherein said isolated ground comprises:
- a non-conductive insulator for receiving and engaging a conductive wire, said non-conductive insulator being secured to said airbag module in a facing spaced relationship defined by a plurality of biasing members disposed between a portion of said non-conductive insulator and a portion of said airbag module, wherein said conductive wire is disposed on a surface of said non-conductive insulator facing said airbag module and said non-conductive insulator and said conductive wire are configured to engage at least one securement member of said steering wheel armature in order to secure said airbag module to said steering wheel armature:
- a first electrical connection secured to said conductive wire and a second electrical connection secured to a conductive portion of said airbag module, wherein said airbag module is movably secured to said insulator for movement between a first position and a second position wherein a conductive portion of said airbag module makes contact with said conductive wire and said floating horn switch is closed as said airbag module moves from said first position to said second position.

14. The assembly as in claim 13, wherein said non-conductive insulator is secured to the airbag module via a plurality of mounting bolts and said plurality of biasing members are disposed over said plurality of mounting bolts between a surface of said airbag module and a portion of said non-conductive insulator, wherein the biasing force of said plurality of biasing members defines said first position.

15. The assembly as in claim 13, wherein said insulator is secured to the airbag module by a plurality of guide members and nuts which movably secure said insulator to the airbag module.

16. The assembly as in claim 15, wherein said guide members are configured to be positioned over securement studs of a retainer ring of the airbag module and said guide members are configured to be slidably received within openings of said insulator.

17. The assembly as in claim 15, wherein said plurality of biasing members are located about each of said guide members and said plurality of biasing members maintain said insulator in a facing spaced relationship with regard to said conductive portion of said airbag module.

* * * * *